United States Patent
Awoniyi-Oteri et al.

(10) Patent No.: US 12,057,995 B2
(45) Date of Patent: *Aug. 6, 2024

(54) TECHNIQUES FOR RADIO LINK FAILURE RECOVERY AND BEAM FAILURE RECOVERY ON SECONDARY CELL GROUP IN DORMANCY STATE

(71) Applicant: QUALCOMM Incorporated, San Diego, CA (US)

(72) Inventors: Olufunmilola Omolade Awoniyi-Oteri, San Diego, CA (US); Jelena Damnjanovic, Del Mar, CA (US); Tao Luo, San Diego, CA (US); Yan Zhou, San Diego, CA (US); Ozcan Ozturk, San Diego, CA (US); Punyaslok Purkayastha, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/167,155

(22) Filed: Feb. 10, 2023

(65) Prior Publication Data

US 2023/0275802 A1    Aug. 31, 2023

Related U.S. Application Data

(63) Continuation of application No. 17/338,075, filed on Jun. 3, 2021, now Pat. No. 11,582,088.

(Continued)

(51) Int. Cl.
*H04L 41/0654*     (2022.01)
*H04L 41/0677*     (2022.01)
(Continued)

(52) U.S. Cl.
CPC ...... *H04L 41/0654* (2013.01); *H04L 41/0677* (2013.01); *H04W 74/0833* (2013.01)

(58) Field of Classification Search
CPC ............. H04B 7/0695; H04L 41/0654; H04L 41/0677; H04W 24/08; H04W 24/10;
(Continued)

(56) References Cited

U.S. PATENT DOCUMENTS 11,483,889 B2    10/2022  Kim
11,582,088 B2 *  2/2023   Awoniyi-Oteri .... H04L 41/0677
(Continued)

FOREIGN PATENT DOCUMENTS

EP    3609285 A1    2/2020
EP    4044758 A1    8/2022
WO    2020028792 A1  2/2020

OTHER PUBLICATIONS

3GPP: "Universal Mobile Telecommunications System (UMTS), LTE, 5G, NR, Multi-connectivity, Overall Description, Stage-2", 3GPP TS 37.340 version 15.5.0 Release 15, ETSI TS 137 340 V15.5.0, May 2019, pp. 1-69.

(Continued)

*Primary Examiner* — Melvin C Marcelo
*Assistant Examiner* — Natali Pascual Peguero
(74) *Attorney, Agent, or Firm* — ArentFox Schiff LLP

(57) ABSTRACT

Aspects of the present disclosure include methods, apparatuses, and computer readable media for radio link failure recovery and beam failure recovery on a secondary cell group (SCG) in dormancy state. In an example, a user equipment (UE) may determine the UE has entered a dormant state with respect to the SCG of a secondary node (SN) having a primary SCG cell (PSCell). The UE may monitor the PSCell to detect a beam failure or a radio link failure while the UE is in the dormant state with respect to (Continued)

the SCG. The UE may transmit, to the SN, a report based on the beam failure or the radio link failure on the PSCell being detected.

31 Claims, 10 Drawing Sheets

Related U.S. Application Data

(60) Provisional application No. 63/065,282, filed on Aug. 13, 2020.

(51) Int. Cl.
  *H04W 74/08* (2024.01)
  *H04W 74/0833* (2024.01)

(58) Field of Classification Search
  CPC .............. H04W 72/231; H04W 72/232; H04W 74/0833; H04W 76/15; H04W 76/19
  See application file for complete search history.

(56) References Cited

U.S. PATENT DOCUMENTS

2020/0059395 A1  2/2020  Chen
2022/0052906 A1  2/2022  Awoniyi-Oteri

OTHER PUBLICATIONS

Apple: "SCG Suspension," 3GPP Draft, 3GPP TSG-RAN WG2 Meeting #108, R2-1915933, 3rd Generation Partnership Project (3GPP), Mobile Competence Centre, 650, Route Des Lucioles, F-06921, Sophia-Antipolis Cedex, France, vol. RAN WG2. No. Reno. Nevada, US, Nov. 18, 2019-Nov. 22, 2019, Nov. 8, 2019 (Nov. 8, 2019), XP051817494, 3 pages, paragraph [02.2], figure 1.
International Search Report and Written Opinion—PCT/US2021/035985—ISA/EPO—Aug. 30, 2021.
OPPO: "Introduction of Dormancy Behavior in NR", 3GPP Draft, 3GPP TSG-RAN WG2 Meeting #108, R2-1914552, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 18, 2019-Nov. 22, 2019, Nov. 8, 2019 (Nov. 8, 2019), XP051816618, 10 Pages, the whole document.

\* cited by examiner

TECHNIQUES FOR RADIO LINK FAILURE RECOVERY AND BEAM FAILURE RECOVERY ON SECONDARY CELL GROUP IN DORMANCY STATE

CROSS-REFERENCE TO RELATED APPLICATIONS

This application is a continuation of U.S. Non-Provisional application Ser. No. 17/338,075 entitled "TECHNIQUES FOR RADIO LINK FAILURE RECOVERY AND BEAM FAILURE RECOVERY ON SECONDARY CELL GROUP IN DORMANCY STATE" and filed on Jun. 3, 2021, which claims the benefit of U.S. Provisional Application Ser. No. 63/065,282, entitled "TECHNIQUES FOR RADIO LINK FAILURE RECOVERY AND BEAM FAILURE RECOVERY ON SECONDARY CELL GROUP IN DORMANCY STATE" and filed on Aug. 13, 2020, which are expressly incorporated by reference herein in its entirety.

BACKGROUND

Aspects of the present disclosure relate generally to wireless communications, and more particularly, to apparatuses and methods for techniques for radio link failure (RLF) recovery and beam failure recovery on secondary cell group (SCG) in a dormancy state.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR) technology) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

SUMMARY

Systems, methods, and apparatus presented herein each have several innovative aspects, no single one of which is solely responsible for the desirable attributes disclosed herein. The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of wireless communication by a user equipment (UE) is provided. The method may include determining the UE has entered a dormant state with respect to a secondary cell group (SCG) of a secondary node (SN) having a primary SCG cell (PSCell) and one or more secondary cells (SCells). The method may include monitoring the SCG to detect a radio link failure on the PSCell or a beam failure on one of the PSCell or an SCell of the one or more SCells, while the UE is in the dormant state with respect to the SCG. The method may include transmitting, to the SN, a report based on the radio link failure or the beam failure being detected.

In another aspect, a method of wireless communication by an apparatus of a PSCell associated with an SCG is provided. The method may include receiving, from the UE, a report based on a radio link failure being detected on the PSCell or a beam failure being detected on one of the PSCell or an SCell of one or more SCells of the SCG, in response to the UE being in a dormant state with respect to the SCG. The method may include determining to perform a recovery procedure with the UE or to not perform the recovery procedure in response to the report. The method may include transmitting, to the UE, an indication that the recovery procedure will be performed or not performed.

In other aspects, apparatus configured to perform one or more methods herein are provided. In other aspects, computer readable mediums having instructions that cause one or more processors to perform one or more methods herein are provided. In other aspects, apparatus having means for performing one or more methods herein are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
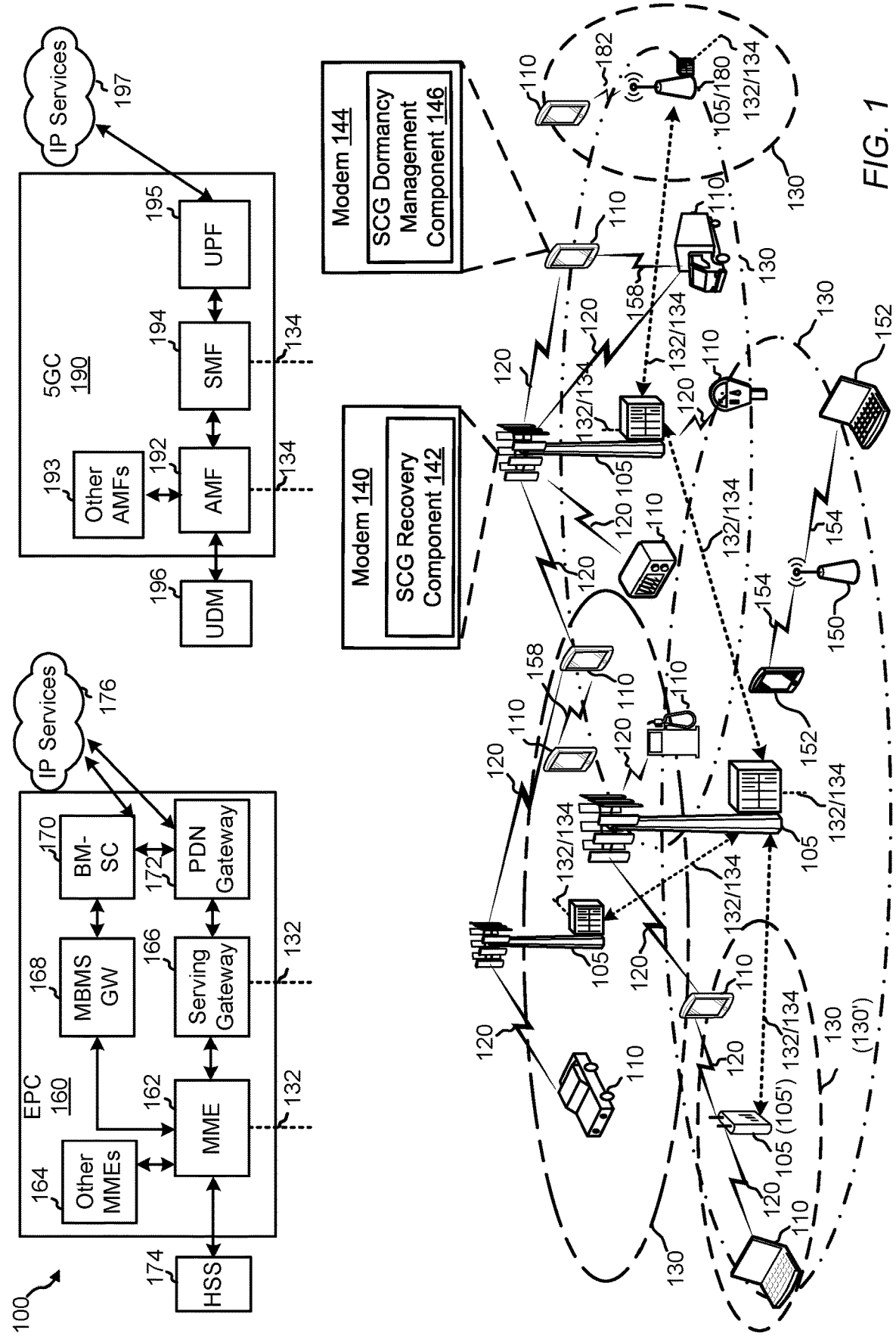
FIG. 1 is a diagram illustrating an example of a wireless communications system and an access network, according to aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Multiple-radio dual-connectivity (MR-DC) may allow a user equipment (UE) to communicate with two radio access networks (RANs), for example, utilizing two frequency bands. One RAN may be provided by a master node (MN) and the other RAN may be provided by a secondary node (SN). The UE may communicate with a group of cells in each of the RANs. For example, the MN may include a master cell group (MCG) and the SN may include a secondary cell group (SCG). In some scenarios, the SCG for the UE may be dormant. For instance, when a data rate for the UE is sufficiently low, the UE is overheating, or based on specific traffic types (e.g., voice over internet protocol (VOIP)), the SCG for the UE may be placed in a dormant SCG state. In the dormant SCG state, the UE may have reduced power consumption and limited communications and measurements (e.g., downlink (DL) control, data monitoring, radio resource management (RRM), channel status information (CSI) measurements) on the SCG.

The present disclosure provides techniques for the UE to transition from the dormant SCG state to an active SCG state using beam failure and radio link failure (RLF) procedures on a primary SCG cell (PSCell) of the SCG while the UE is in the dormant SCG state. In particular, a goal of the UE during the dormant SCG state is to achieve power saving with reduced latency for the SCG during a transition from the dormant SCG state to the active SCG state. In doing so, additional signaling and measurements for beam management may be used for frequency range designations FR1 (e.g., 410 MHz-7.125 GHz) and FR2 (e.g., 24.25 GHz-52.6 GHz). Examples of the measurements include RRMs, radio link monitoring (RLMs), beam failure detection (BFD) measurements, and, in some cases, Layer 1 (L1) measurements. In an example, L1 measurements include CSI measurements and sounding reference signal (SRS) transmissions that enable mechanisms such as beam management, time tracking, etc.

In an aspect, an RLM procedure may be enabled on the PSCELL when the SCG is in the dormant SCG state to detect a radio link failure (RLF) on the PSCell. As opposed to conventional RLM methods, which only apply RLM procedures to active bandwidth parts, in this proposal the RLM procedure is performed on the dormant bandwidth parts of the PSCELL. In an example, the RLM procedure may be performed on the PSCell and not secondary cells (SCells) of the SCG. For example, for new radio dual connectivity (NR-DC) intraband carrier aggregation (CA), both the PSCell and the SCells may use FR2, which may result in measurements of the PSCell that highly correlate to the SCells of the SCG in this case.

In another aspect, a BFD procedure is performed to detect BFD. The BFD procedure may be performed on both the PSCELL and SCELLs of the SCG. For E-tran new radio dual connectivity (EN-DC) interband CA, the PSCell may use FR1 and the SCells may use FR2, which may result in measurements of the PSCell that do not correlate with the SCells of the SCG in this case. For example, the Quasi Co-Locations (QCLs)/spatial relationships on the PSCELL and SCELLs may be vastly different in the EN-DC interband CA.

In the dormant SCG state, the RLM procedure may ensure that the PSCell RLF and beam failure are detected, and the BFD may ensure that the beam failure on the SCells are detected.

Regarding BFD, if a beam failure is detected, a beam failure report may be communicated to an SN by sending a beam failure report through a random access channel (RACH) to the SN through the PSCell. In an example, the RACH message may be performed with a best DL beam of the PSCell or the SCells being identified after the BFD.

Alternatively, if a beam failure is detected, the beam failure report may be communicated to the SN with the best DL beam (or buffer status report) through the MCG of the MN. In this example, the communication may be done via radio resource control (RRC) signaling, media access control control element (MAC CE) signaling, or DL control information (DCI) signaling.

After the SN receives the report, the SN may notify the UE whether to perform a beam failure recovery (BFR) on the SCG or not. If the BFR is needed, the SN may give the UE contention free resources to RACH. If the BFR is not needed, the SN may indicate to the UE to remain in the dormant SCG state.

Whether to send the report to the SN via a RACH message or the MCG may be configured at a start of the dormancy SCG state or dynamically configured and sent to the SCG through MCG during dormancy.

Regarding RLF, if an RLF is detected, a message can be sent to the SN through the MCG. In response to the message, the SN may decide to stay in an RLF state for a duration of time, as the SCG is in dormancy and may not need immediate recovery. Alternatively, the SN may trigger measurements on the SCells to see if the PScell can be replaced with one of the SCells in the SCG.

Performing the additional signaling and measurements, including RLM and BFD as described herein, may provide quick transition out of the dormant SCG state, as compared to methods used without these signaling and measurements.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

Turning now to the figures, examples of systems, apparatus, and methods for RLF recovery and beam failure recovery on SCG in a dormancy state are depicted. It is to be understood that aspects of the figures may not be drawn to scale and are instead drawn for illustrative purposes.

FIG. 1 is a diagram illustrating an example of a wireless communications system and an access network 100. The wireless communications system (also referred to as a wireless wide area network (WWAN)) includes at least one base station 105, UEs 110, an Evolved Packet Core (EPC) 160, and a 5G Core (5GC) 190. The base station 105 may include macro cells (high power cellular base station) and/or small cells (low power cellular base station). The macro cells include base stations. The small cells include femtocells, picocells, and microcells.

In some implementations, the base station 105 may include a modem 140 and/or an SCG recovery component 142 for recovering the SCG on the UE 110. In some implementations, the UE 110 may include a modem 144 and/or an SCG dormancy management component 146 for managing SCG during a dormant SCG state.

A base station 105 configured for 4G LTE (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A base station 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the base station 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base station 105 may communicate directly or indirectly (e.g., through the EPC 160 or 5GC 190) with each other over the backhaul links interfaces 134. The backhaul links 132, 134 may be wired or wireless.

The base station 105 may wirelessly communicate with the UEs 110. Each of the base station 105 may provide communication coverage for a respective geographic coverage area 130. There may be overlapping geographic coverage areas 130. For example, the small cell 105' may have a coverage area 130' that overlaps the coverage area 130 of one or more macro base station 105. A network that includes both small cell and macro cells may be known as a heterogeneous network. A heterogeneous network may also include Home Evolved Node base station (eNBs) (HeNBs), which may provide service to a restricted group known as a closed subscriber group (CSG). The communication links 120 between the base station 105 and the UEs 110 may include uplink (UL) (also referred to as reverse link) transmissions from a UE 110 to a base station 105 and/or DL (also referred to as forward link) transmissions from a base station 105 to a UE 110. The communication links 120 may use multiple-input and multiple-output (MIMO) antenna technology, including spatial multiplexing, beamforming, and/or transmit diversity. The communication links may be through one or more carriers. The base station 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A base station 105, whether a small cell 105' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 110. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base station 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The base station 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
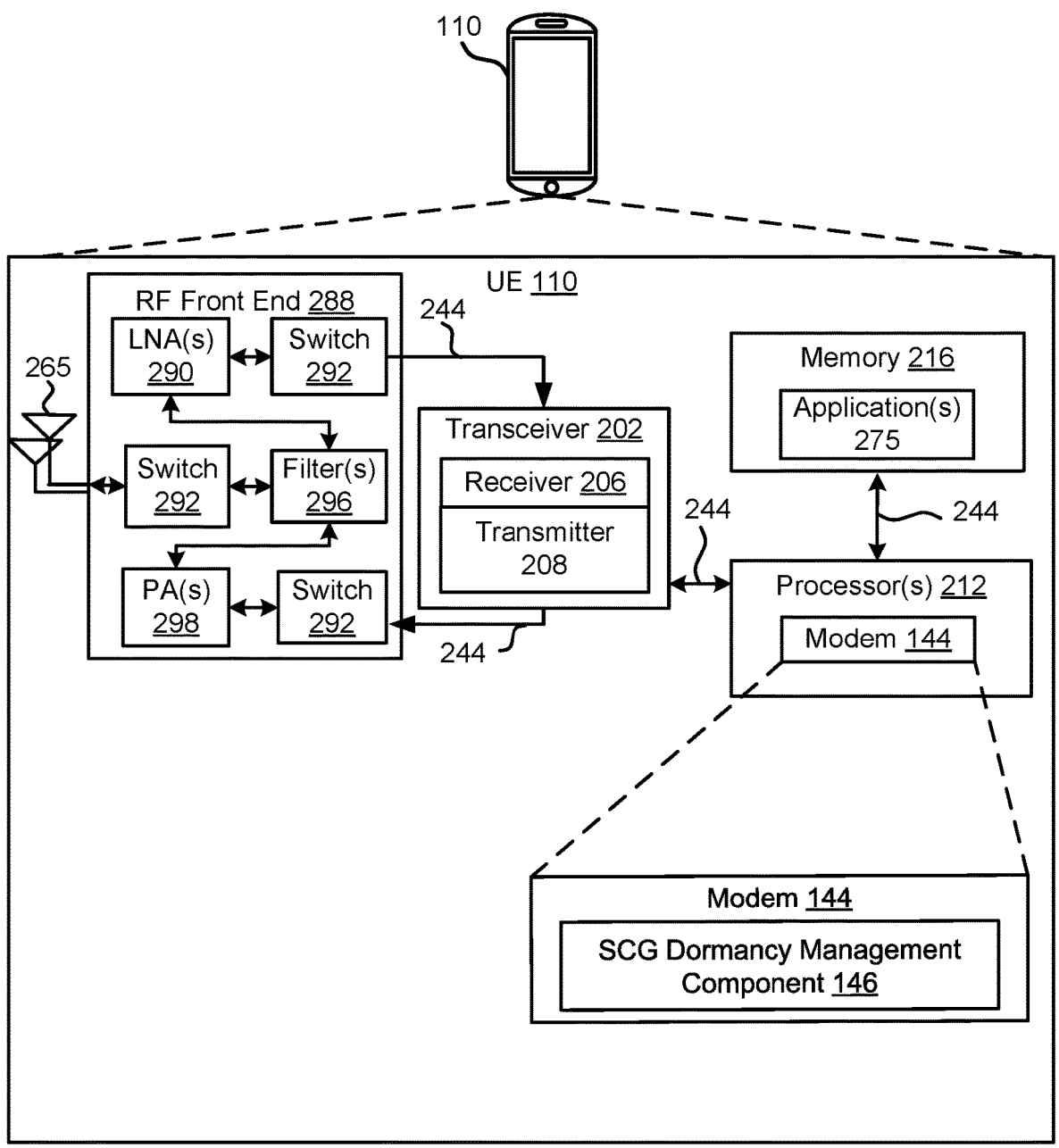
FIG. 2 is a schematic diagram of an example of a user equipment (UE) of FIG. 1, according to aspects of the present disclosure.

Referring to FIG. 2, an example implementation of the UE 110 may include the modem 144 having the SCG dormancy management component 146. The modem 144 and/or the SCG dormancy management component 146 of the UE 110 may be configured to manage communications to the base station 105 via a cellular network, a Wi-Fi network, or other wireless and wired networks.

In some implementations, the UE 110 may include a variety of components, including components such as one or more processors 212 and memory 216 and transceiver 202 in communication via one or more buses 244, which may operate in conjunction with the modem 144 and the SCG dormancy management component 146 to enable one or more of the functions described herein related to dormancy management of the UE 110. Further, the one or more processors 212, modem 144, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 144 that uses one or more modem processors. The various functions related to the SCG dormancy management component 146 may be included in the modem 144 and/or the processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 144 may configure the UE 110 along with the processors 212. In other aspects, some of the features of the one or more processors 212 and/or the modem 144 associated with the SCG dormancy management component 146 may be performed by the transceiver 202.

Also, the memory 216 may be configured to store data used herein and/or local versions of applications 275 or the SCG dormancy management component 146 and/or one or more subcomponents of the SCG dormancy management component 146 being executed by at least one processor 212. The memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, the memory 216 may be a non-transitory computer-readable storage medium that stores one or more computer-executable codes defining the SCG dormancy management component 146 and/or one or more of its subcomponents, and/or data associated therewith, when the UE 110 is operating at least one processor 212 to execute the SCG dormancy management component 146 and/or one or more of the subcomponents.

The transceiver 202 may include at least one receiver 206 and at least one transmitter 208. The receiver 206 may include hardware, firmware, and/or software code executable by a processor for receiving data, the code comprising instructions and being stored in a memory (e.g., computer-readable medium). The receiver 206 may be, for example, an RF receiving device. In an aspect, the receiver 206 may receive signals transmitted by at least one base station 105. The transmitter 208 may include hardware, firmware, and/or software code executable by a processor for transmitting data, the code comprising instructions and being stored in a memory (e.g., computer-readable medium). A suitable example of the transmitter 208 may include, but is not limited to, an RF transmitter.

Moreover, in an aspect, the UE 110 may include the RF front end 288, which may operate in communication with one or more antennas 265 and the transceiver 202 for receiving and transmitting radio transmissions, for example, wireless communications transmitted by at least one base station 105 or wireless transmissions transmitted by the UE 110. The RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, the LNA 290 may amplify a received signal at a desired output level. In an aspect, each of the LNAs 290 may have a specified minimum and maximum gain values. In an aspect, the RF front end 288 may use one or more switches 292 to select a particular LNA 290 and the specified gain value based on a desired gain value for a particular application.

Further, for example, one or more PA(s) 298 may be used by the RF front end 288 to amplify a signal for an RF output at a desired output power level. In an aspect, each of the PAs 298 may have specified minimum and maximum gain values. In an aspect, the RF front end 288 may use one or more switches 292 to select a particular PA 298 and the specified gain value based on a desired gain value for a particular application.

Also, for example, one or more filters 296 may be used by the RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, the RF front end 288 may use one or more switches 292 to select a transmit or receive path using a specified filter 296, the LNA 290, and/or the PA 298, based on a configuration as specified by the transceiver 202 and/or processor 212.

As such, the transceiver 202 may be configured to transmit and receive wireless signals through one or more antennas 265 via the RF front end 288. In an aspect, the transceiver 202 may be tuned to operate at specified frequencies such that the UE 110 may communicate with, for example, one or more of the base stations 105 or one or more cells associated with one or more of the base stations 105. In an aspect, for example, the modem 144 may configure the transceiver 202 to operate at a specified frequency and power level based on a UE configuration of the UE 110 and the communication protocol used by the modem 144.

In an aspect, the modem 144 may be a multiband-multimode modem, which may process digital data and communicate with the transceiver 202 such that the digital data is sent and received using the transceiver 202. In an aspect, the modem 144 may be multiband and be configured to support multiple frequency bands for a specific communications protocol. In an aspect, the modem 144 may be multimode and be configured to support multiple operating networks and communications protocols. In an aspect, the modem 144 may control one or more components of the UE 110 (e.g., RF front end 288, transceiver 202) to enable transmission and/or reception of signals from the network based on a specified modem configuration. In an aspect, a modem configuration may be based on the mode of the modem 144 and the frequency band in use. In another aspect, the modem configuration may be based on UE configuration information associated with the UE 110 as provided by the network (e.g., base station 105).

Figure 3:
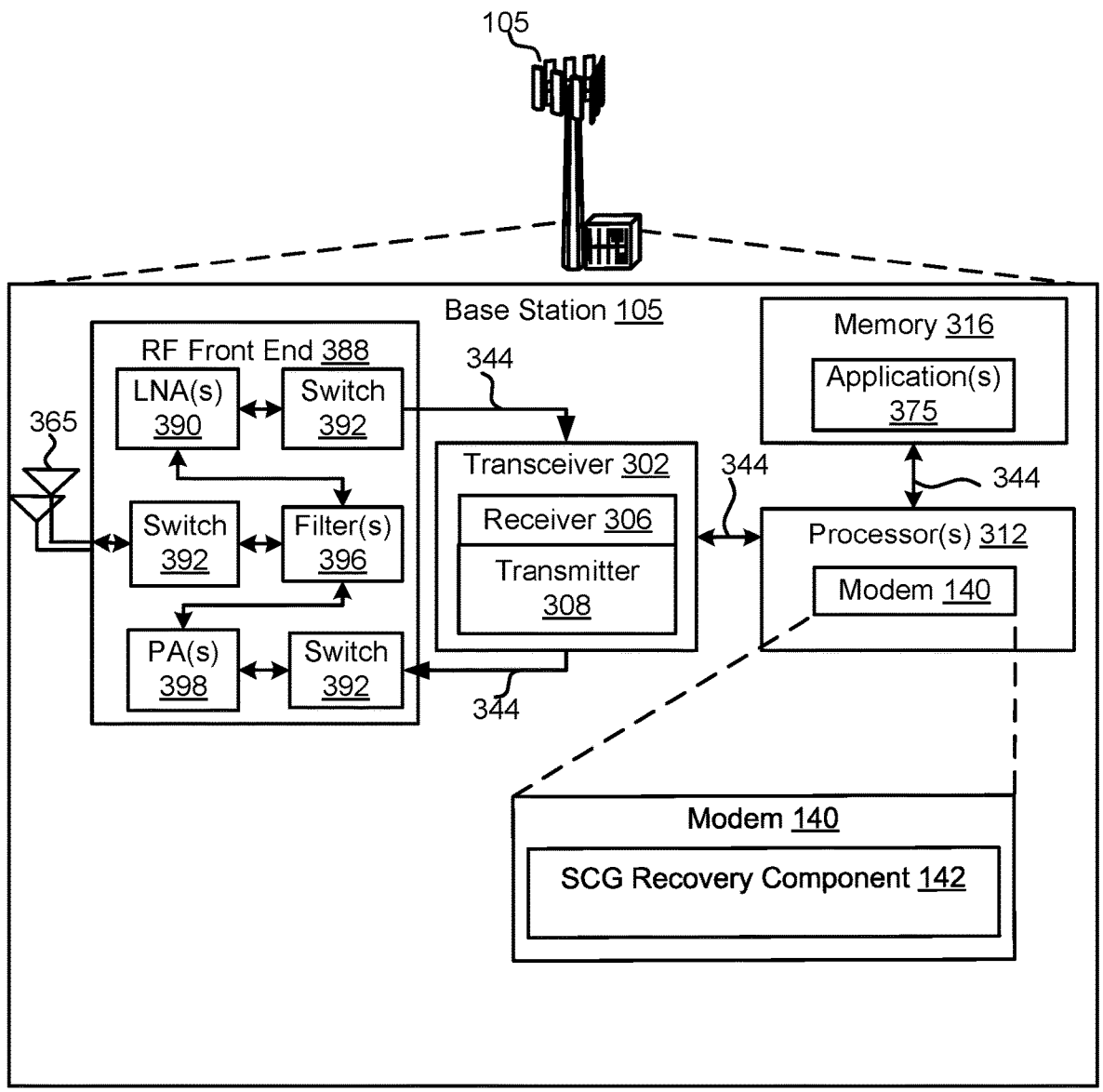
FIG. 3 is a schematic diagram of an example of a base station of FIG. 1, according to aspects of the present disclosure.

Referring to FIG. 3, an example implementation of the base station 105 may include the modem 140 with the SCG recovery component 142 configured to recover SCG on the UE 110. The modem 140 and/or the SCG recovery component 142 of the base station 105 may be configured to communicate with the UE 110 via a cellular network, a Wi-Fi network, or other wireless and wired networks.

In some implementations, the base station 105 may include a variety of components, including components such as one or more processors 312 and memory 316 and transceiver 302 in communication via one or more buses 344, which may operate in conjunction with the modem 140 and the SCG recovery component 142 to enable one or more of the functions described herein related to SCG recovery. Further, the one or more processors 312, the modem 140, the memory 316, the transceiver 302, a RF front end 388, and one or more antennas 365, may be configured to support voice and/or data calls (simultaneously or non-simultaneously) in one or more radio access technologies. The one or more antennas 365 may include one or more antennas, antenna elements and/or antenna arrays.

In an aspect, the one or more processors 312 may include the modem 140 that uses one or more modem processors. The various functions related to the SCG recovery component 142 may be included in the modem 140 and/or the processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with the transceiver 302. Additionally, the modem 140 may configure the base station 105 and the processors 312. In other aspects, some of the features of the one or more processors 312 and/or the modem 140 associated with the SCG recovery component 142 may be performed by the transceiver 302.

Also, the memory 316 may be configured to store data used herein and/or local versions of applications 375 or the SCG recovery component 142, and/or one or more subcomponents of the SCG recovery component 142 being executed by at least one processor 312. The memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, the memory 316 may be a non-transitory computer-readable storage medium that stores one or more computer-executable codes defining the SCG recovery component 142 and/or one or more of the subcomponents, and/or data associated therewith, when the base station 105 is operating at least one processor 312 to execute the SCG recovery component 142 and/or one or more of the subcomponents.

The transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, an RF receiving device. In an aspect, the receiver 306 may receive signals transmitted by the UE 110. The transmitter 308 may include hardware, firmware, and/or software code executable by a processor for transmitting data, the code comprising instructions and being stored in a memory (e.g., computer-readable medium). A suitable example of the transmitter 308 may include, but is not limited to, an RF transmitter.

Moreover, in an aspect, the base station 105 may include the RF front end 388, which may operate in communication with one or more antennas 365 and the transceiver 302 for receiving and transmitting radio transmissions, for example, wireless communications transmitted by other base stations 105 or wireless transmissions transmitted by the UE 110. The RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, the LNA 390 may amplify a received signal at a desired output level. In an aspect, each of the LNAs 390 may have a specified minimum and maximum gain values. In an aspect, the RF front end 388 may use one or more switches 392 to select a particular LNA 390 and the specified gain value based on a desired gain value for a particular application.

Further, for example, one or more PA(s) 398 may be used by the RF front end 388 to amplify a signal for an RF output at a desired output power level. In an aspect, each PA 398 may have specified minimum and maximum gain values. In an aspect, the RF front end 388 may use one or more switches 392 to select a particular PA 398 and the specified gain value based on a desired gain value for a particular application.

Also, for example, one or more filters 396 may be used by the RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, the RF front end 388 may use one or more switches 392 to select a transmit or receive path using a specified filter 396, the LNA 390, and/or the PA 398, based on a configuration as specified by the transceiver 302 and/or the processor 312.

As such, the transceiver 302 may be configured to transmit and receive wireless signals through one or more antennas 365 via the RF front end 388. In an aspect, transceiver may be tuned to operate at specified frequencies such that the base station 105 may communicate with, for example, the UE 110 or one or more cells associated with one or more base station 105. In an aspect, for example, the modem 140 may configure the transceiver 302 to operate at a specified frequency and power level based on the base station configuration of the base station 105 and the communication protocol used by the modem 140.

In an aspect, the modem 140 may be a multiband-multimode modem, which may process digital data and communicate with the transceiver 302 such that the digital data is sent and received using the transceiver 302. In an aspect, the modem 140 may be multiband and be configured to support multiple frequency bands for a specific communications protocol. In an aspect, the modem 140 may be multimode and be configured to support multiple operating networks and communications protocols. In an aspect, the modem 140 may control one or more components of the base station 105 (e.g., RF front end 388, transceiver 302) to enable transmission and/or reception of signals from the network based on a specified modem configuration. In an aspect, the modem configuration may be based on the mode of the modem 140 and the frequency band in use. In another aspect, the modem configuration may be based on a base station configuration associated with the base station 105.

Referring to FIGS. 4-8, examples of communications between the UE 110, an MN 402, and an SN 404 are disclosed. In these examples, the UE 110 may initially be in dual connectivity with the MN 402 and the SN 404. In these examples, the MN 402 includes an MCG having a set of cells communicatively coupled to the MN 402, and the SN 404 includes an SCG having a set of cells communicatively coupled to the SN 404. Further, for these examples, the SCG has entered a dormancy state with the UE 110 but the MCG is in an active communication state with the UE 110. As described herein, the SCG may be dormant, for example, to preserve power on the UE 110, for certain traffic types (e.g., VOIP), or for any other reasoning.

Figure 4:
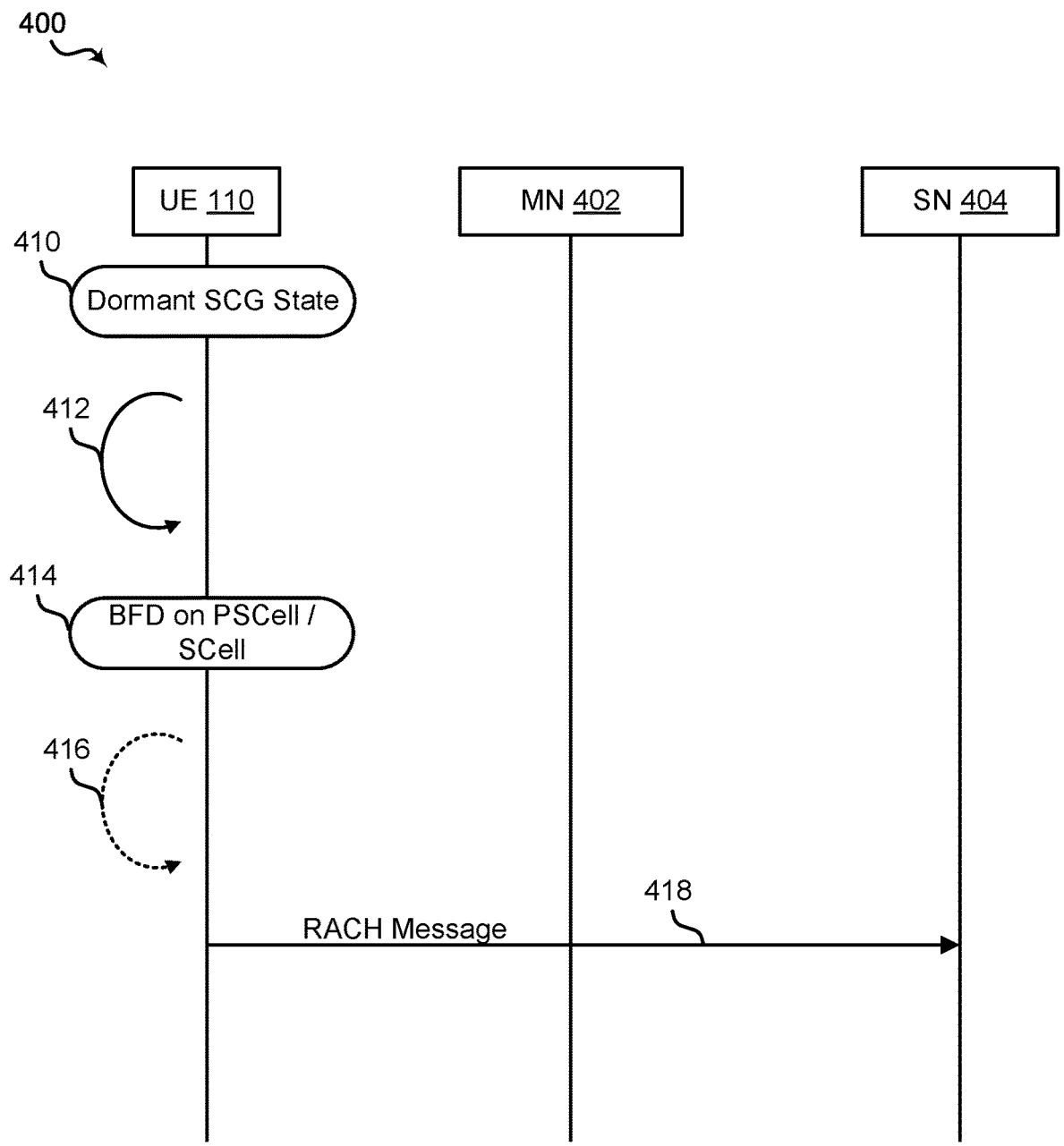
FIG. 4 is call flow diagram of an example beam failure procedure, according to aspects of the present disclosure.

Turning to FIG. 4, an example beam failure procedure 400 including communications between the UE 110 and the SN 404 without the use of the MN 402, is provided. The UE 110 may determine that the SCG is in a dormant SCG state 410 based on, for example, receiving a message from the MN 402 indicating the SCG dormancy, a dormancy SCG setting (e.g., dormancy bit), or any other method for determining a dormancy state.

When the SCG enters the dormant SCG state 410, the UE 110 may trigger a BFD procedure 412 on the PSCell and/or the SCells of the SCG. In an example, during the BFD procedure 412, the UE 110 may monitor the PSCell or the SCell. The BFD procedure 412 may look at one or more measurements of the PSCell or the SCell made by the SN 404 and sent to the UE 110 after the dormant SCG state 410. The measurements of the PScell or the SCell may be obtained, for example, via one or more reference signals from the SN 404.

During the BFD procedure 412, the UE 110 may also compare the measurements to one or more thresholds to determine whether a beam failure is detected. For example one or more of an RSRP or SINR may be compared to one or more thresholds. If one or more of the thresholds indicate a beam failure occurred, the UE 110 determines BFD 414 on the PSCell or the SCell occurred. In response to the detection of BFD 414, the UE 110 may perform a best DL beam procedure 416 for the UE 110 to determine a best DL beam to communicate with the SN 404. In an example, the UE 404 may determine the best DL beam from a plurality of DL beams of the SCG based on one or more of the measurements from the SN 404. An example of a best DL beam may include a DL beam for the plurality of DL beams having, for example, the signal power greater than signal powers of other DL beams of the plurality of DL beams.

Further in response to the detection of BFD 414, the UE 110 may also transmit a RACH message 418 to the SN 404 on the PSCell. The RACH message 418 may include a BFD report and in some examples, a best beam identification identifying the best DL beam 416 for the SN 404 to communicate with the UE 110.

While use of the RACH message 418 through the PSCell may allow the SN 404 to perform beam failure recovery (BFR), use of the DL beam may be risky as the UL beam may have failed. Also, sending the RACH message 418 may be contention based (e.g., competing with other UEs RACH messages) or non-contention based. In the case of a contention based RACH, the UE 110 may send a preamble to the SN 404 to allow the RACH procedure to be more likely to work, than if the preamble is not sent. In an example, the SN 404 may designate the preamble to the UE 110 prior to the SCG entering the dormant SCG state 410 thereby providing a more direct connection for the UE 110 to communicate with the SN 404 via a RACH procedure.

Figure 5:
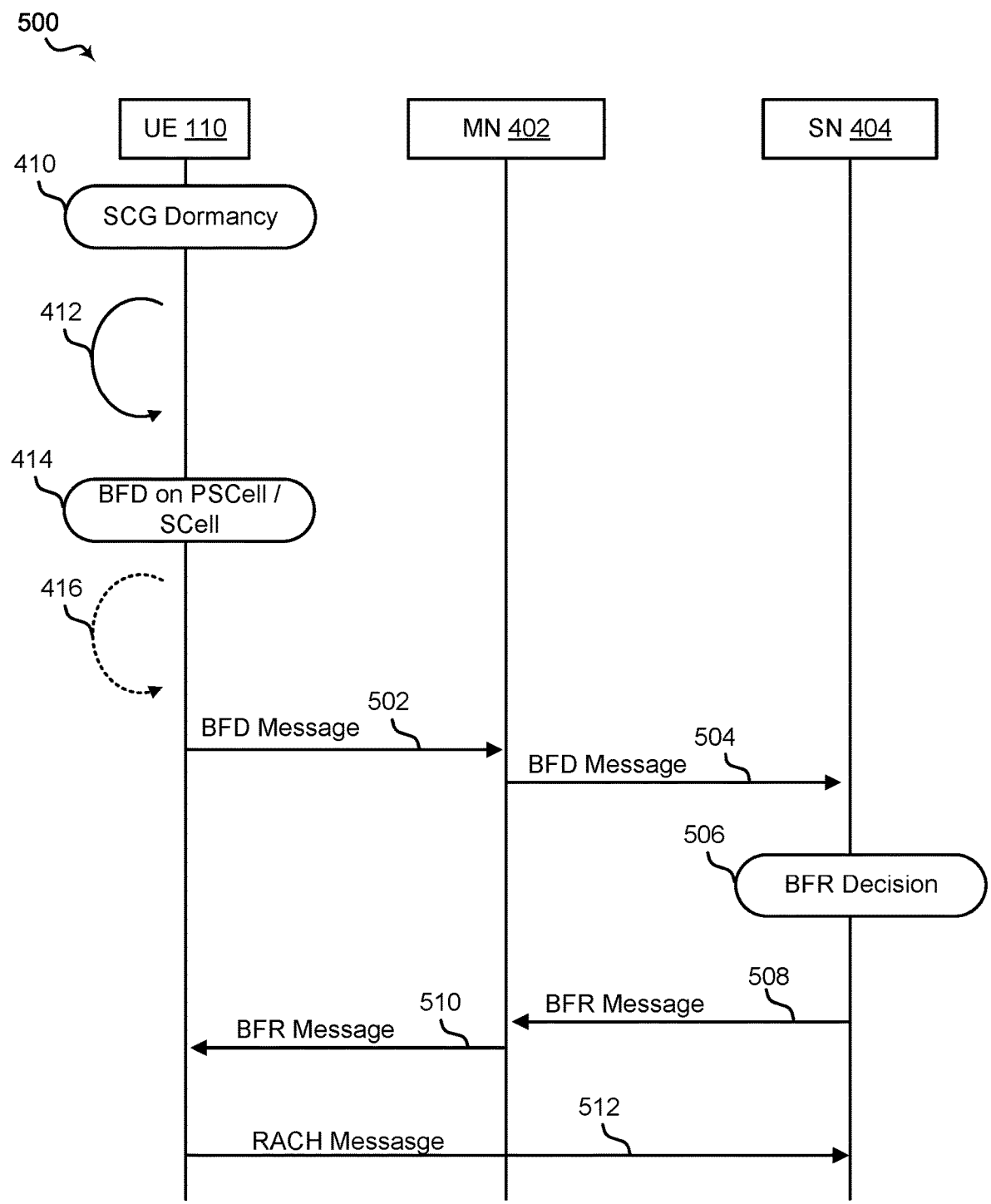
FIG. 5 is call flow diagram of another example beam failure procedure, according to aspects of the present disclosure.

Turning to FIG. 5, an example beam failure procedure 500 including communications between the UE 110 and the SN 404 through the MN 402 is provided. As the dormant SCG state 410, the BFD procedure 412, the BFD 414, and best DL beam procedure 416 have been previously described.

In response to the detection of BFD 414, the UE 110 may transmit a BFD message 502 to the MN 402 using the MCG. In an example, the BFD message 502 may include a BFD report indicating the beam failure of the PSCell and/or the SCell along with a request to the MN 402 to forward the BFD report to the SN 404. In another example, the BFD message 502 may also include the identification of the best DL beam for communicating with the SN 404 identified through the best DL beam procedure 416.

In response to the BFD message 502, the MN 402 may forward the BFD message 504 including the BFD report and, in some examples, the identification of the best DL beam to the SN 404.

Based on the BFD report, the SN 404 may perform a BFR decision 506 to determine whether to perform BFR of the PSCell or the SCell. In an example, the SN 404 may determine to transition the SCG to an active SCG state based on, for example, communication needs (e.g., UE 110 has data to transmit or expects to receive data) of the UE 110. In this example, the SN 404 may determine to perform BFR with the UE 110.

In response to the BFR decision 506 of performing the BFR, the SN 404 may transmit a BFR message 508 to the MN 402. The BFR message 508 may include an indication of BFR resources, such as RACH resources, for the UE 110 to communicate with the SN 404. The BFR message 508 may also include a request to the MN 402 to forward the BFR message 508 to the UE 110.

In response to the BFR message 508, the MN 402 may forward the BFR message 510 including the indication of the BFR resources to the UE 110.

In response to the BFR message 510 and based on the BFR resources indicated by the SN 404, the UE 110 may transmit a RACH message 512 to the SN 404 to perform the BFR.

In an example, each of the BFD message 502, the BFD message 504, the BFR message 508, and the BFR message 510 may be transmitted in one or more of an RRC message, a MAC CE message, or a DCI message.

Figure 6:
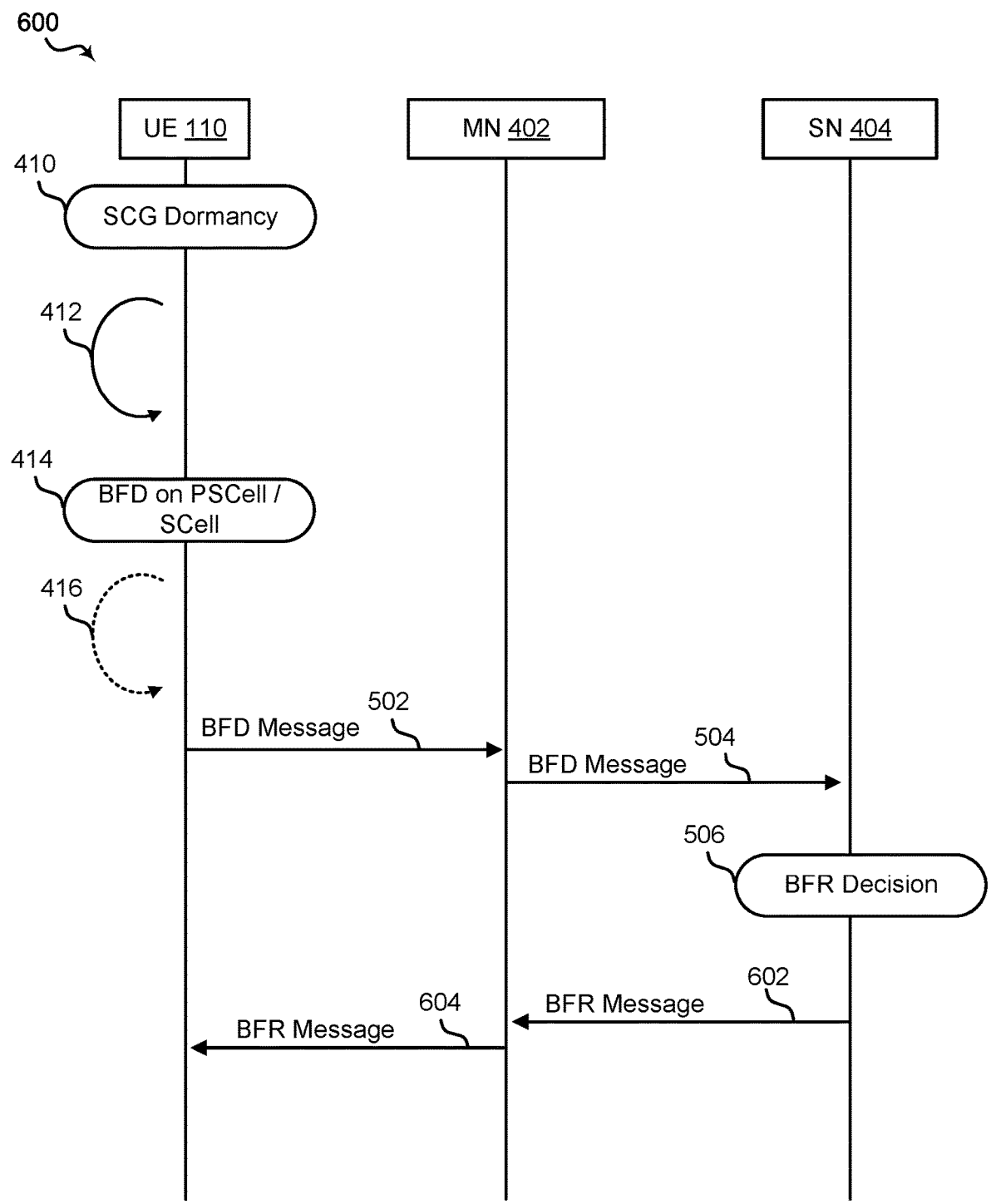
FIG. 6 is call flow diagram of another example beam failure procedure, according to aspects of the present disclosure.

Turning to FIG. 6, another example beam failure procedure 600 including communications between the UE 110 and the SN 404 through the MN 402 is provided. As the BFD message 502 and the BFD message 504 have been previously described.

As previously indicated, based on the BFD report, the SN 404 may perform a BFR decision 506 to determine whether to perform BFR of the PSCell or the SCell. As the SCG is dormant, there may not be a need for the SCG to transition to an active SCG state. For example, the UE 110 may be using a particular type of communication (e.g., VOIP) that does not use the SCG, or the UE 110 may be overheating. In this example, the SN 404 may determine not to perform BFR with the UE 110.

Therefore, in response to the BFR decision 506 of not performing the BFR, the SN 404 may transmit a BFR message 602 to the MN 402. The BFR message 602 may include an indication of not performing the BFR and a request to the MN 402 to forward the BFR message 508 to the UE 110. In an example, the indication may be one or more bits indicating the decision of the SN 404. In response to the BFR message 602, the MN 402 may forward the BFR message 604 including the indication of not performing the BFR to the UE 110. In this example, in response to the UE 110 receiving the indication of not performing the BFR, the SCG remains in a dormant SCG state thereby the UE 110 does not communicate via the SCG.

In an example, each of the BFR message 602 and the BFR message 604 may be transmitted in one or more of an RRC message, a MAC CE message, or a DCI message.

Figure 7:
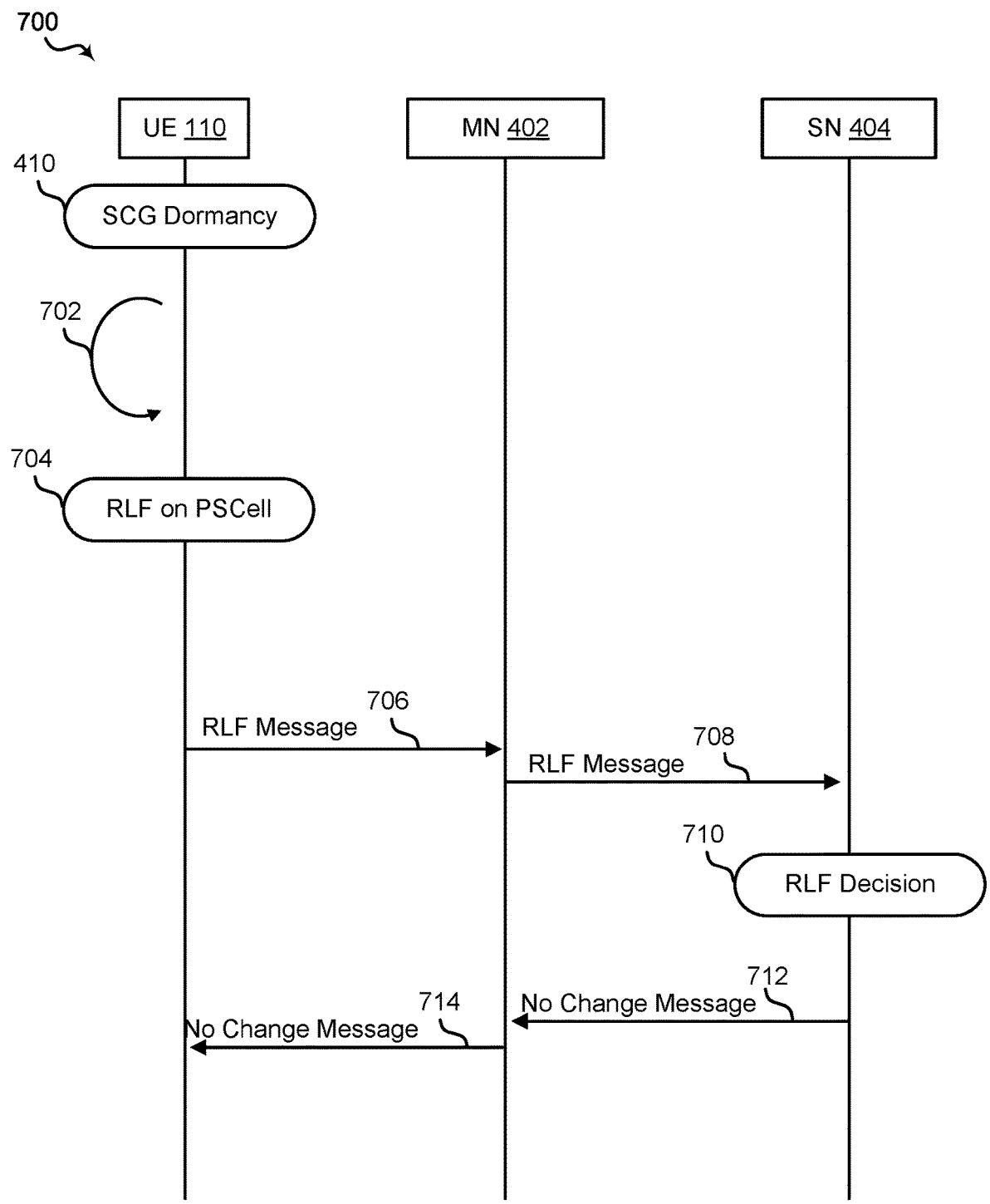
FIG. 7 is call flow diagram of an example radio link failure procedure, according to aspects of the present disclosure.

Turning to FIG. 7, an example RLF recovery procedure 700 including communications between the UE 110 and the SN 404 through the MN 402 is provided. As the dormant SCG state 410 has been previously described, further details are not provided in this example.

When the SCG enters the dormant SCG state 410, the UE 110 may trigger a RLF procedure 702 on the PSCell of the SCG. In an example, during the RLF procedure 702, the UE 110 may monitor the PSCell. The RLF procedure 702 may look at one or more measurements of the PSCell made by the SN 404 and sent to the UE 110 after the dormant SCG state 410. The measurements of the PScell may be obtained, for example, via one or more reference signals from the SN 404.

During the RLF procedure 702, the UE 110 may also compare the measurements to one or more thresholds to determine whether a RLF is detected. For example, one or more of an RSRP or an SINR may be compared to one or more thresholds. If one or more of the thresholds indicate a RLF occurred, the UE 110 determines RLF 704 on the PSCell occurred.

In response to the detection of RLF 704, the UE 110 may transmit an RLF message 706 to the MN 402 using the MCG. In an example, the RLF message 706 may include an RLF report indicating the RLF of the PSCell along with a request to the MN 402 to forward the RLF report to the SN 404. In response to the RLF message 706, the MN 402 may forward RLF message 708 including the RLF report to the SN 404.

Based on the RLF report, the SN 404 may perform an RLF decision 710 to determine whether to perform RLF of the PSCell. In an example, the SN 404 may determine to transition the SCG to an active SCG state based on, for example, communication needs (e.g., UE 110 has data to transmit or expects to receive data) of the UE 110. In this example, the SN 404 may determine not to perform RLF recovery with the UE 110.

Therefore, in response to the RLF decision 710 of not performing the RLF recovery, the SN 404 may transmit a no change message 712 to the MN 402. The no change message 712 may include an indication of not performing the RLF recovery and a request to the MN 402 to forward the no change message 712 to the UE 110. In an example, the indication may be one or more bits indicating the no change decision of the SN 404. In response to the no change message 712, the MN 402 may forward no change message 714 including the indication of not performing the RLF recovery to the UE 110. In this example, in response to the UE 110 receiving the indication of not performing the RLF recovery, the SCG remains in a dormant SCG state thereby the UE 110 does not communicate via the SCG.

In an example, each of the RLF message 706, the RLF message 708, the no change message 712, and the no change message 712 may be transmitted in one or more of an RRC message, a MAC CE message, or a DCI message.

Figure 8:
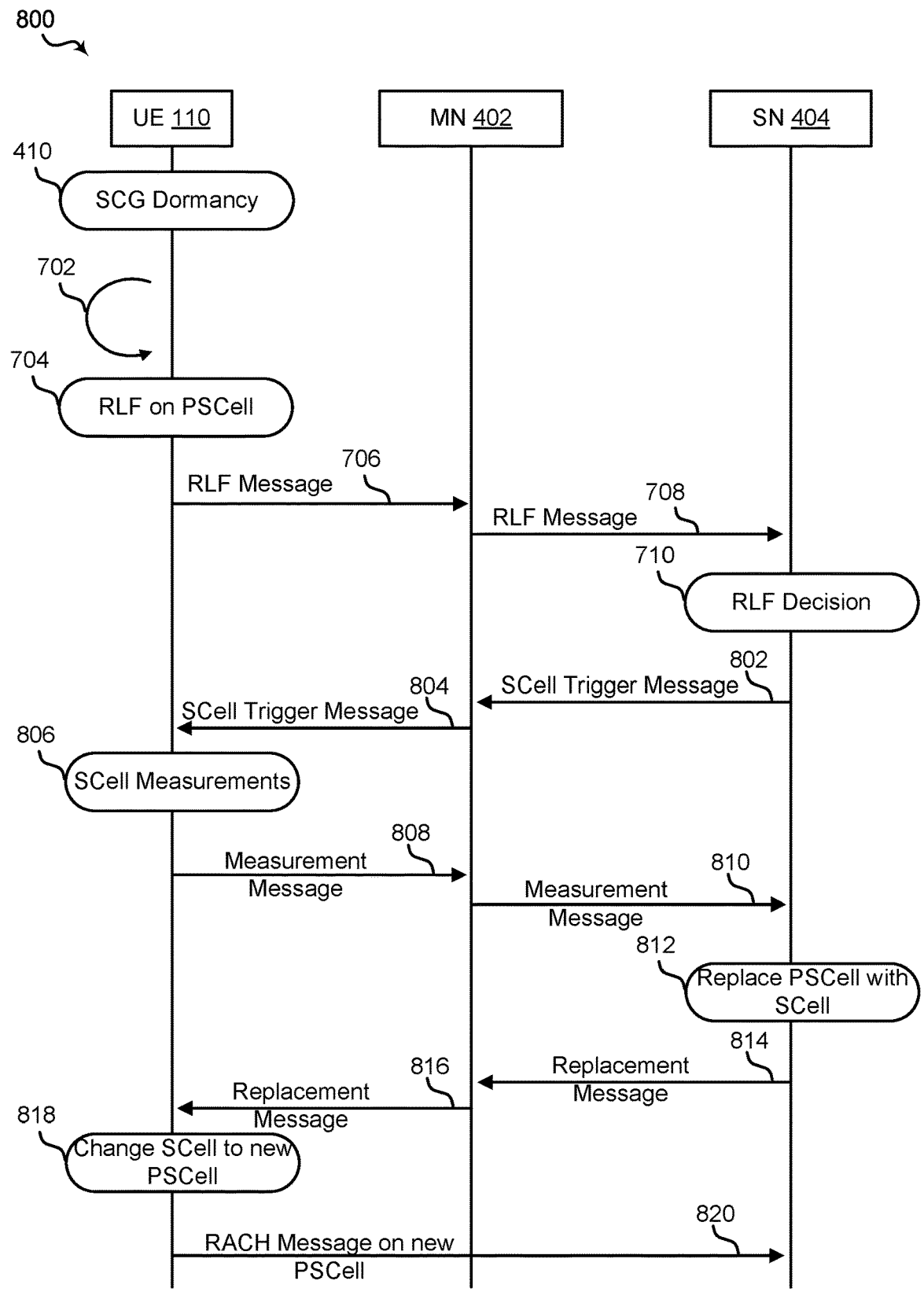
FIG. 8 is call flow diagram of another example radio link failure procedure, according to aspects of the present disclosure.

Turning to FIG. 8, an example RLF recovery procedure 800 including communications between the UE 110 and the SN 404 through the MN 402 is provided. As the dormant SCG state 410, the RLF procedure 702, the RLF 704, the RLF message 706, the RLF message 708, and RLF decision 710 have been previously described, further details are not provided in this example.

As previously described, based on the RLF report, the SN 404 may perform the RLF decision 710 to determine whether to perform RLF of the PSCell. In an example, the SN 404 may determine to transition the SCG to an active SCG state based on, for example, communication needs (e.g., UE 110 has data to transmit or expects to receive data) of the UE 110. In this example, the SN 404 may determine to perform the RLF recovery with the UE 110.

Therefore, in response to the RLF decision 710 of performing the RLF recovery, the SN 404 may transmit a SCell trigger message 802 to the MN 402. The SCell trigger message 802 may include SCell measurements request for the UE 110 to perform measurements of the SCells. The SCell trigger message 802 may also include a request to the MN 402 to forward the SCell trigger message 802 to the UE 110. In response to the SCell trigger message 802, the MN 402 may forward SCell trigger message 804 including the SCell measurements request to the UE 110.

In response to the UE 110 receiving the SCell trigger message 804, the UE 110 may perform measurements (e.g., RSRP or SINR) of one or more SCells to determine whether the PSCell can be replaced by an SCell.

The UE 110 may transmit a measurement message 808 to the MN 402 indicating results of the measurements of the one or more SCells along with a request to the MN 402 to forward the measurement message 808 to the SN 404. In response to the measurement message 808, the MN 402 may forward measurement message 810 including the results of the SCell measurements to the SN 404.

In an example, the SN 404 may review the results of the SCell measurements and make a determination 812 to replace the PSCell with an SCell. In an example, the SN 404 may make the determination 812 to replace the PSCell with the SCell by selecting the SCell based on the measurements indicating the SCell having, for example, a higher signal power than the PSCell.

Therefore, in response to the determination 812 to replace the PSCell, the SN 404 may transmit a replacement message 814 to the MN 402. The replacement message 814 may include an indication of the SCell the UE 110 should use to replace the PSCell along with a request to the MN 402 to forward the replacement message 814 to the UE 110. In an example, the indication of the SCell may include an identification of the SCell selected by the SN 404. In response to the replacement message 814, the MN 402 may forward replacement message 816 including the indication of the selected SCell to replace the PSCell to the UE 110.

The UE 110 may receive the replacement message 816 and change the SCell to the new PSCell 818. For example, the UE 110 may store the identification of the SCell as the PSCell for future communications. Once the new PSCell is stored, the UE 110 may transmit a RACH message on the new PSCell to the SN 404 for RLF recovery.

In an example, each of the SCell trigger message 802, the SCell trigger message 804, the measurement message 808, the measurement message 810, the replacement message 814, and the replacement message 816 may be transmitted in one or more of an RRC message, a MAC CE message, or a DCI message.

Figure 9:
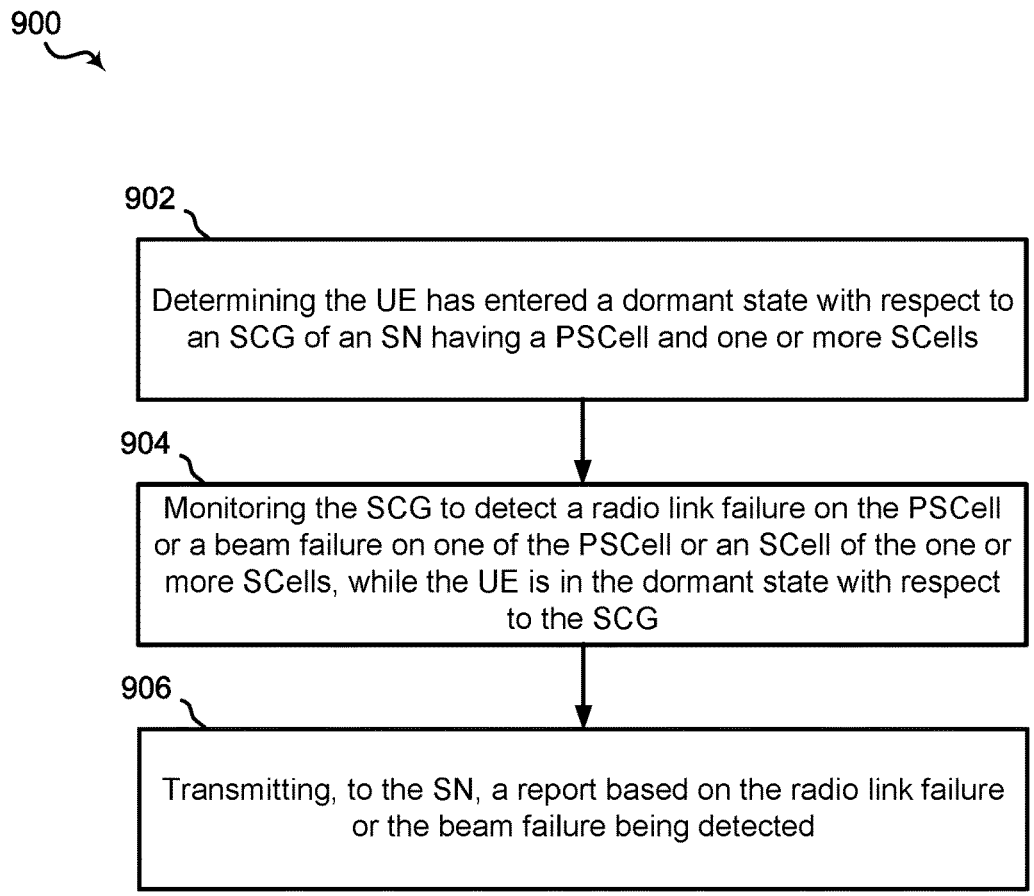
FIG. 9 is a flow diagram of an example method performed by the UE of FIG. 1, according to aspects of the present disclosure.

Referring to FIG. 9, an example of a method 900 for performing recovery of SCG while in a dormant SCG state may be performed by the SCG dormancy management component 146, the modem 144, the processor 212, and/or the memory 216 of the UE 110 of the wireless communication network 100.

At block 902, the method 900 may include determining the UE has entered a dormant state with respect to an SCG of an SN having a PSCell and one or more SCells. For example, the SCG dormancy management component 146, the modem 144, the processor 212, and/or one or more additional components/subcomponents of the UE 110 may determine the UE 110 has entered a dormant SCG state 410 with respect to the SCG of the SN 404 having the PSCell and one or more SCells, as illustrated by FIGS. 4-8. In an example, determination of the dormant state may be based on a message from the SN 404 or a dormancy state setting (e.g., dormancy bit) indicating the dormancy state.

In certain implementations, the processor 212, the modem 144, the SCG dormancy management component 146, and/or one or more other components or subcomponents of the UE 110 may be configured to and/or may define means for determining the UE has entered a dormant state with respect to an SCG of an SN having a PSCell and one or more SCells.

At block 904, the method 900 may include monitoring the SCG to detect a radio link failure on the PSCell or a beam failure on one of the PSCell or an SCell of the one or more SCells, while the UE is in the dormant state with respect to the SCG. For example, the SCG dormancy management component 146, the modem 144, the processor 212, and/or one or more other components or subcomponents of the UE 110 may perform the BFD procedure 412 of FIGS. 4-6 or the RLF procedure 702 of FIGS. 7 and 8 to monitor the SCG to detect the RLF 704 on the PSCell or the beam failure 414 on one of the PSCell or the SCell while the UE 110 is in the dormant SCG state 410 with respect to the SCG.

In certain implementations, the processor 212, the modem 144, the SCG dormancy management component 146, the transceiver 202, the receiver 206, the transmitter 208, the RF front end 288, and/or the subcomponents of the RF front end 288 may be configured to and/or may define means for monitoring the SCG to detect a radio link failure on the PSCell or a beam failure on one of the PSCell or an SCell of the one or more SCells, while the UE is in the dormant state with respect to the SCG.

At block 906, the method 900 may include transmitting, to the SN, a report based on the radio link failure or the beam failure being detected. For example, the SCG dormancy management component 146, the modem 144, the processor 212, the transceiver 202, and/or one or more other components or subcomponents of the UE 110 may transmit, to the SN 404, the RACH message 418 of FIG. 4, the BFD message 502 of FIGS. 5 and 6, or the RLF message 706 of FIGS. 7 and 8 including a report based on the beam failure 414 or the RLF 704 being detected.

In certain implementations, the processor 212, the modem 144, the SCG dormancy management component 146, the transceiver 202, the receiver 206, the transmitter 208, the RF front end 288, and/or the subcomponents of the RF front end 288 may be configured to and/or may define means for transmitting, to the SN, a report based on the radio link failure or the beam failure being detected.

In an example, the transmitting of the report may comprise transmitting, to the SN on the PSCell, an RACH message including the report in response to the beam failure being detected. The SCG dormancy management component 146, the modem 144, the processor 212, and/or one or more other components or subcomponents of the UE 110 may transmit, to the SN 404 on the PSCell, the RACH message 418 of FIG. 4 including the report in response to the beam failure 414 being detected. In certain implementations, the processor 212, the modem 144, the SCG dormancy management component 146, the transceiver 202, the receiver 206, the transmitter 208, the RF front end 288, and/or the subcomponents of the RF front end 288 may be configured to and/or may define means for transmitting, to the SN on the PSCell, an RACH message including the report in response to the beam failure being detected.

In an example, the method 800 may also include determining a best DL beam for the PSCell or the SCell of the SCG for communicating with the SN in response to the beam failure being detected on the PSCell or the SCell; and transmitting, to the SN, an indication of the DL beam for communication with the UE. In another example, the SCG dormancy management component 146, the modem 144, the processor 212, and/or one or more other components or subcomponents of the UE 110 may determine a best DL beam 416 of FIGS. 4-6 for the PSCell or the SCell of the SCG for communicating with the SN 404 in response to the beam failure 414 of FIGS. 4-6 being detected on the PSCell or the SCell; and transmit, to the SN 404, an indication (in the BFD message 502 of FIG. 5) of the DL beam for communication with the UE 110. In certain implementations, the processor 212, the modem 144, the SCG dormancy management component 146, the transceiver 202, the receiver 206, the transmitter 208, the RF front end 288, and/or the subcomponents of the RF front end 288 may be configured to and/or may define means for determining a best DL beam for the PSCell or the SCell of the SCG for communicating with the SN in response to the beam failure being detected on the PSCell or the SCell; and transmitting, to the SN 404, an indication of the DL beam for communication with the UE.

In an example, the method 900 may also include transmitting the report to an MN having an MCG along with instructions to forward the report to the SN. In another example, the SCG dormancy management component 146, the modem 144, the processor 212, and/or one or more other components or subcomponents of the UE 110 may transmit the report (e.g., BFD message 502 of FIGS. 5 and 6, RLF message 706 of FIGS. 7 and 8) to MN 402 having the MCG along with instructions to forward the report to the SN 404. In certain implementations, the processor 212, the modem 144, the SCG dormancy management component 146, the transceiver 202, the receiver 206, the transmitter 208, the RF front end 288, and/or the subcomponents of the RF front end 288 may be configured to and/or may define means for transmitting the report to the MN 402 having the MCG along with instructions to forward the report to the SN.

In an example, the report may be transmitted via one of a RRC message, a MAC CE message, or a DCI message.

In an example, the method 900 may also include receiving, from the SN via the MN in response to the transmitting of the report, an indication of resources for a BFR procedure on the SCG. In another example, the SCG dormancy management component 146, the modem 144, the processor 212, and/or one or more other components or subcomponents of the UE 110 may receive, from the SN 404 via the MN 402 in response to the transmitting of the report (e.g., BFD message 502 of FIGS. 5 and 6, RLF message 706 of FIGS. 7 and 8), an indication of resources (e.g., RACH resources) for a BFR procedure on the SCG. In certain implementations, the processor 212, the modem 144, the SCG dormancy management component 146, the transceiver 202, the receiver 206, the transmitter 208, the RF front end 288, and/or the subcomponents of the RF front end 288 may be configured to and/or may define means for receiving, from the SN 404 via the MN 402 in response to the transmitting of the report, an indication of resources for a BFR procedure on the SCG.

In an example, the method 900 may also include communicating with the SN through a RACH message on the PSCell in response to the receiving of the indication of resources for the BFR procedure on the PSCell or the SCell of the SCG. In another example, the SCG dormancy management component 146, the modem 144, the processor 212, and/or one or more other components or subcomponents of the UE 110 may communicate with the SN 404 through the RACH message (e.g., RACH message 418 of FIG. 4, RACH message 512 of FIG. 5) on the PSCell in response to the receiving of the indication of resources for the BFR procedure on the PSCell or the SCell of the SCG. In certain implementations, the processor 212, the modem 144, the SCG dormancy management component 146, the transceiver 202, the receiver 206, the transmitter 208, the RF front end 288, and/or the subcomponents of the RF front end 288 may be configured to and/or may define means for communicating with the SN through an RACH message on the PSCell in response to the receiving of the indication of resources for the BFR procedure on the PSCell or the SCell of the SCG.

In an example, the method 900 may also include receiving, from the SN via the MN in response to the transmitting of the report, an indication that no BFR procedure on the SCG will be performed. In another example, the SCG dormancy management component 146, the modem 144, the processor 212, and/or one or more other components or subcomponents of the UE 110 may receive, from the SN 404 via the MN 402 in response to the transmitting of the report, an indication that no BFR procedure (e.g., BFR message 604 of FIG. 6) on the SCG will be performed. In certain implementations, the processor 212, the modem 144, the SCG dormancy management component 146, the transceiver 202, the receiver 206, the transmitter 208, the RF front end 288, and/or the subcomponents of the RF front end 288 may be configured to and/or may define means for receiving, from the SN 404 via the MN 402 in response to the transmitting of the report, an indication that no BFR procedure on the SCG will be performed.

In an example, the method 900 may also include receiving, from the SN 404 via the MN 402 in response to the transmitting of the report, an indication for the UE 110 to remain in a RLF state on the PSCell. In another example, the SCG dormancy management component 146, the modem 144, the processor 212, and/or one or more other components or subcomponents of the UE 110 may receive, from the SN 404 via the MN 402 in response to the transmitting of the report, an indication (e.g., no change message 712 of FIG. 7) for the UE 110 to remain in a RLF state on the PSCell. In certain implementations, the processor 212, the modem 144, the SCG dormancy management component 146, the transceiver 202, the receiver 206, the transmitter 208, the RF front end 288, and/or the subcomponents of the RF front end 288 may be configured to and/or may define means for receiving, from the SN 404 via the MN 402 in response to the transmitting of the report, an indication for the UE 110 to remain in a RLF state on the PSCell.

In an example, the method 900 may also include receiving, from the SN 404 via the MN 402 in response to the transmitting of the report, first instructions to perform one or more measurements on the one or more SCells of the SCG. In another example, the SCG dormancy management component 146, the modem 144, the processor 212, and/or one or more other components or subcomponents of the UE 110 may receive, from the SN 404 via the MN 402 in response to the transmitting of the report, first instructions (e.g., SCell trigger message 802 of FIG. 8) to perform one or more measurements on the one or more SCells of the SCG. In certain implementations, the processor 212, the modem 144, the SCG dormancy management component 146, the transceiver 202, the receiver 206, the transmitter 208, the RF front end 288, and/or the subcomponents of the RF front end 288 may be configured to and/or may define means for receiving, from the SN 404 via the MN 402 in response to the transmitting of the report, first instructions to perform one or more measurements on the one or more SCells of the SCG.

In an example, the method 900 may also include performing the one or more measurements on the one or more SCells in response to receiving of the instructions; and transmitting, to the SN 404 via the MN 402, a measurement report. In another example, the SCG dormancy management component 146, the modem 144, the processor 212, and/or one or more other components or subcomponents of the UE 110 may perform the one or more measurements 806 on the one or more SCells in response to receiving of the first instructions; and transmit, to the SN 404 via the MN 402, a measurement report (e.g., measurement message 808). In certain implementations, the processor 212, the modem 144, the SCG dormancy management component 146, the transceiver 202, the receiver 206, the transmitter 208, the RF front end 288, and/or the subcomponents of the RF front end 288 may be configured to and/or may define means for performing the one or more measurements on the one or more SCells in response to receiving of the instructions; and transmitting, to the SN 404 via the MN 402, a measurement report.

In an example, the method 900 may also include receiving, from the SN 404 via the MN 404, second instructions to update the PSCell to a selected SCell of the one or more SCells in response to the transmitting of the measurement report. In another example, the SCG dormancy management component 146, the modem 144, the processor 212, and/or one or more other components or subcomponents of the UE 110 may receive, from the SN 404 via the MN 402, second instructions (e.g., replacement message 814) to update the PSCell to a selected SCell of the one or more SCells in response to the transmitting of the measurement report. In certain implementations, the processor 212, the modem 144, the SCG dormancy management component 146, the transceiver 202, the receiver 206, the transmitter 208, the RF front end 288, and/or the subcomponents of the RF front end 288 may be configured to and/or may define means for receiving, from the SN 404 via the MN 402, second instructions to update the PSCell to a selected SCell of the one or more SCells in response to the transmitting of the measurement report.

In an example, the method 900 may also include transmitting an RACH message on the selected SCell. In another example, the SCG dormancy management component 146, the modem 144, the processor 212, and/or one or more other components or subcomponents of the UE 110 may transmit the RACH message 820 on the new PSCell which is the selected SCell. In certain implementations, the processor 212, the modem 144, the SCG dormancy management component 146, the transceiver 202, the receiver 206, the transmitter 208, the RF front end 288, and/or the subcomponents of the RF front end 288 may be configured to and/or may define means for transmitting an RACH message on the selected SCell.

Figure 10:
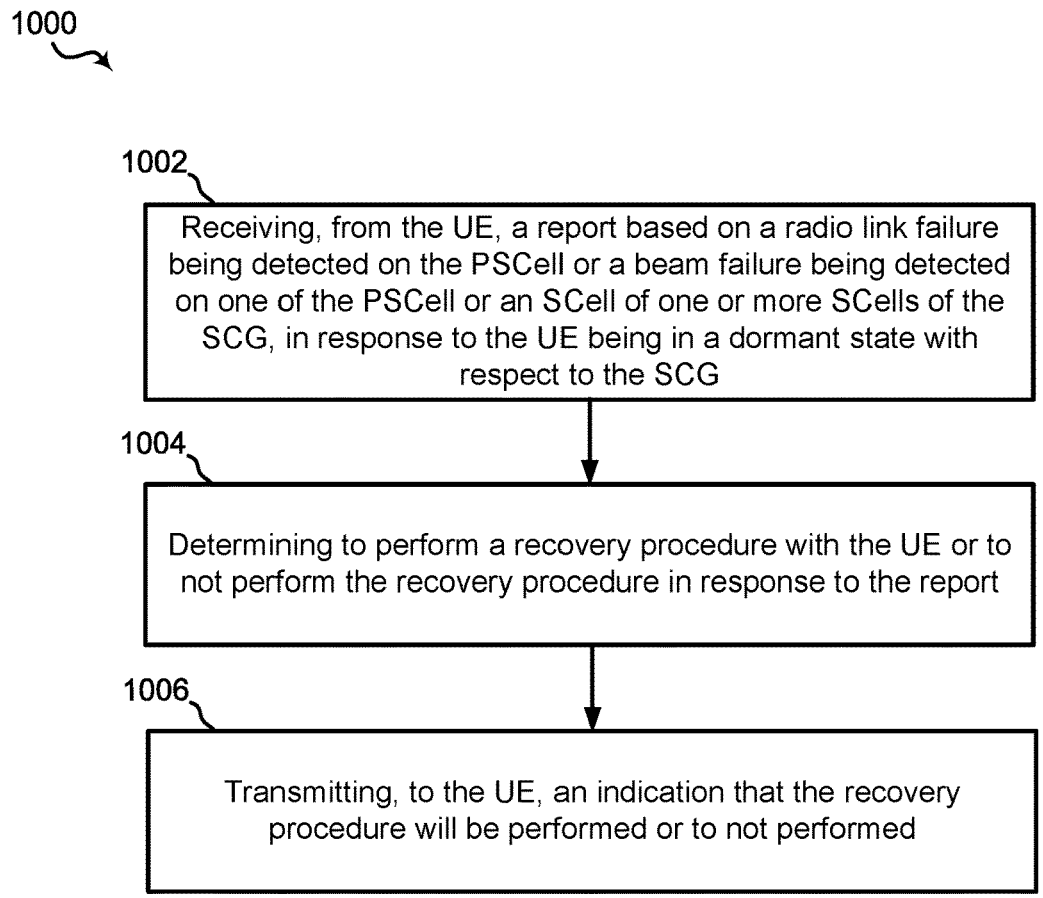
FIG. 10 is flow diagram of an example method performed by the base station of FIG. 1, according to aspects of the present disclosure.

Referring to FIG. 10, an example of a method 1000 for performing a recovery procedure during a dormant SCG state may be performed by the SCG recovery component 142, the modem 140, the processor 312, the memory 316, and/or one or more additional components/subcomponents of the base station 105 in the wireless communication network 100.

At block 1002, the method 1000 may include receiving, from the UE, a report based on a radio link failure being detected on the PSCell or a beam failure being detected on one of the PSCell or an SCell of one or more SCells of the SCG, in response to the UE being in a dormant state with respect to the SCG. For example, the SCG recovery component 142, the modem 140, the processor 312, the memory 316, and/or one or more components/subcomponents of the base station 105 may receive, from the UE 110, a report (e.g., RACH message 418 of FIG. 4, BFD message 502 of FIGS. 5 and 6, RLF message 708 of FIGS. 7 and 8) based on a RLF being detected (e.g., RLF 702 of FIGS. 7 and 8)

on the PSCell or the beam failure (e.g., BFD 414 of FIGS. 4-6) on the PSCell or an SCell, in response to the UE 110 being in a dormant state with respect to the SCG.

In certain implementations, the processor 312, the modem 140, the SCG recovery component 142, the transceiver 302, the receiver 306, the transmitter 308, the RF front end 388, and/or the subcomponents of the RF front end 388 may be configured to and/or may define means for receiving, from the UE, a report based on a radio link failure being detected on the PSCell or a beam failure being detected on one of the PSCell or an SCell of one or more SCells of the SCG, in response to the UE being in a dormant state with respect to the SCG.

In some examples, the report may be received in an RACH message on the PSCell. In some examples, the report may include an indication of a best DL beam for the PSCell or the SCell of the SCG for communicating with the UE in response to the beam failure being detected on the PSCell or the SCell. The indication may include an identification of the DL beam for the PSCell or the SCell. In some examples, the report may be received from an MN having an MCG. In some examples, the report may be received via one of an RRC message, an MAC CE message, or a DCI message.

At block 1004, the method 1000 may include determining to perform a recovery procedure with the UE or to not perform the recovery procedure in response to the report. For example, the SCG recovery component 142, the modem 140, and/or the processor 312 of the base station 105 may determine (e.g., BFR decision 506 of FIGS. 5 and 6, RLF decision 710 of FIGS. 7 and 8) to perform a recovery procedure with the UE 110 or to not perform the recovery procedure in response to the report.

In certain implementations, the processor 312, the modem 140, the SCG recovery component 142, the transceiver 302, the receiver 306, the transmitter 308, the RF front end 388, and/or the subcomponents of the RF front end 388 may be configured to and/or may define means for determining to perform a recovery procedure with the UE or to not perform the recovery procedure in response to the report.

At block 1006, the method 1000 may include transmitting, to the UE, an indication that the recovery procedure will be performed or to not performed. For example, the SCG recovery component 142, the modem 140, and/or the processor 312 of the base station 105 may transmit, to the UE 110, an indication (e.g., BFR message 510 or 604 of FIGS. 5 and 6, no change message 712 or SCell trigger message 802 of FIGS. 7 and 8) that the recovery procedure will be performed or to not performed.

In certain implementations, the processor 312, the modem 140, the SCG recovery component 142, the transceiver 302, the receiver 306, the transmitter 308, the RF front end 388, and/or the subcomponents of the RF front end 388 may be configured to and/or may define means for determining to perform a recovery procedure with the UE or to not perform the recovery procedure in response to the report.

In an example, the method 1000 may also include transmitting, to the UE via the MN in response to the receiving of the report, an indication of resources for the recovery procedure on the SCG, wherein the recovery procedure is a BFR procedure, and wherein the report includes an indication of the beam failure being detected on the PSCell or the SCell. For example, the SCG recovery component 142, the modem 140, and/or the processor 312 of the base station 105 may transmit, to the UE 110 via the MN 402 in response to the receiving of the report, an indication of resources for the recovery procedure on the SCG, wherein the recovery procedure is a BFR procedure, and wherein the report includes an indication of the beam failure being detected on the PSCell or the SCell. In certain implementations, the processor 312, the modem 140, the SCG recovery component 142, the transceiver 302, the receiver 306, the transmitter 308, the RF front end 388, and/or the subcomponents of the RF front end 388 may be configured to and/or may define means for transmitting, to the UE 110 via the MN 402 in response to the receiving of the report, an indication of resources for the recovery procedure on the SCG, wherein the recovery procedure is a BFR procedure, and wherein the report includes an indication of the beam failure being detected on the PSCell or the SCell.

In an example, the method 1000 may also include communicating with the UE through an RACH message on the PSCell in response to the transmitting of the indication of resources for the BFR procedure on the SCG. For example, the SCG recovery component 142, the modem 140, and/or the processor 312 of the base station 105 may communicate with the UE through an RACH message on the PSCell in response to the transmitting of the indication of resources for the BFR procedure on the SCG. In certain implementations, the processor 312, the modem 140, the SCG recovery component 142, the transceiver 302, the receiver 306, the transmitter 308, the RF front end 388, and/or the subcomponents of the RF front end 388 may be configured to and/or may define means for communicating with the UE through an RACH message on the PSCell in response to the transmitting of the indication of resources for the BFR procedure on the SCG.

In an example, the method 1000 may also include transmitting, to the UE via the MN in response to the receiving of the report, the indication that the recovery procedure will not be performed, wherein the recovery procedure is a BFR procedure on the SCG, wherein the report includes an indication of the beam failure being detected on the PSCell or the SCell. For example, the SCG recovery component 142, the modem 140, and/or the processor 312 of the base station 105 may transmit, to the UE 110 via the MN 402 in response to the receiving of the report, the indication that the recovery procedure will not be performed, wherein the recovery procedure is a BFR procedure on the SCG, wherein the report includes an indication of the beam failure being detected on the PSCell or the SCell. In certain implementations, the processor 312, the modem 140, the SCG recovery component 142, the transceiver 302, the receiver 306, the transmitter 308, the RF front end 388, and/or the subcomponents of the RF front end 388 may be configured to and/or may define means for transmitting, to the UE 110 via the MN 402 in response to the receiving of the report, the indication that the recovery procedure will not be performed, wherein the recovery procedure is a BFR procedure on the SCG, wherein the report includes an indication of the beam failure being detected on the PSCell or the SCell.

In an example, the method 1000 may also include transmitting, to the UE via the MN, the indication that the recovery procedure will not be performed, in response to the receiving of the report, wherein the recovery procedure is a radio link recovery procedure on the SCG, wherein the report includes an indication of the radio link failure being detected. For example, the SCG recovery component 142, the modem 140, and/or the processor 312 of the base station 105 may transmit, to the UE 110 via the MN 402, the indication that the recovery procedure will not be performed, in response to the receiving of the report, wherein the recovery procedure is a radio link recovery procedure on the SCG, wherein the report includes an indication of the radio link failure being detected. In certain implementations, the processor 312, the modem 140, the SCG recovery component 142, the transceiver 302, the receiver 306, the transmitter 308, the RF front end 388, and/or the subcomponents of the RF front end 388 may be configured to and/or may define means for transmitting, to the UE 110 via the MN 402, the indication that the recovery procedure will not be performed, in response to the receiving of the report, wherein the recovery procedure is a radio link recovery procedure on the SCG, wherein the report includes an indication of the radio link failure being detected.

In an example, the method 1000 may also include transmitting, to the UE via the MN, first instructions to perform one or more measurements on the one or more SCells of the SCG in response to the receiving of the report, wherein the report includes an indication of the radio link failure being detected. For example, the SCG recovery component 142, the modem 140, and/or the processor 312 of the base station 105 may transmit, to the UE 110 via the MN 402, first instructions to perform one or more measurements on the one or more SCells of the SCG in response to the receiving of the report, wherein the report includes an indication of the radio link failure being detected. In certain implementations, the processor 312, the modem 140, the SCG recovery component 142, the transceiver 302, the receiver 306, the transmitter 308, the RF front end 388, and/or the subcomponents of the RF front end 388 may be configured to and/or may define means for transmitting, to the UE 110 via the MN 402, first instructions to perform one or more measurements on the one or more SCells of the SCG in response to the receiving of the report, wherein the report includes an indication of the radio link failure being detected.

In an example, the method 1000 may also include receiving, from the UE via the MN, a measurement report in response to the transmitting of the first instructions. For example, the SCG recovery component 142, the modem 140, and/or the processor 312 of the base station 105 may receive, from the UE 110 via the MN 402, a measurement report in response to the transmitting of the first instructions. In certain implementations, the processor 312, the modem 140, the SCG recovery component 142, the transceiver 302, the receiver 306, the transmitter 308, the RF front end 388, and/or the subcomponents of the RF front end 388 may be configured to and/or may define means for receiving, from the UE 110 via the MN 402, a measurement report in response to the transmitting of the first instructions.

In an example, the method 1000 may also include transmitting, to the UE via the MN, second instructions to update the PSCell to a selected SCell of the one or more SCells in response to the receiving of the measurement report. For example, the SCG recovery component 142, the modem 140, and/or the processor 312 of the base station 105 may transmit, to the UE 110 via the MN 402, second instructions to update the PSCell to a selected SCell of the one or more SCells in response to the receiving of the measurement report. In certain implementations, the processor 312, the modem 140, the SCG recovery component 142, the transceiver 302, the receiver 306, the transmitter 308, the RF front end 388, and/or the subcomponents of the RF front end 388 may be configured to and/or may define means for transmitting, to the UE 110 via the MN 402, second instructions to update the PSCell to a selected SCell of the one or more SCells in response to the receiving of the measurement report.

In an example, the method 1000 may also include receiving, from the UE, an RACH message on the selected SCell. For example, the SCG recovery component 142, the modem 140, and/or the processor 312 of the base station 105 may receive, from the UE 110, an RACH message on the selected SCell. In certain implementations, the processor 312, the modem 140, the SCG recovery component 142, the transceiver 302, the receiver 306, the transmitter 308, the RF front end 388, and/or the subcomponents of the RF front end 388 may be configured to and/or may define means for receiving, from the UE 110, an RACH message on the selected SCell.

Additional Implementations

1. An example method of wireless communication by a UE, comprising: determining the UE has entered a dormant state with respect to an SCG of an SN having a PSCell and one or more SCells; monitoring the SCG to detect a radio link failure on the PSCell or a beam failure on one of the PSCell or an SCell of the one or more SCells, while the UE is in the dormant state with respect to the SCG; and transmitting, to the SN, a report based on the radio link failure or the beam failure being detected.

The above example method wherein the report includes an indication of the beam failure being detected, and wherein the transmitting of the report comprises transmitting, to the SN on the PSCell, an RACH message including the report in response to the beam failure being detected.

One or more of the above example methods further comprising: determining a best DL beam for the PSCell or the SCell of the SCG for communicating with the SN in response to the beam failure being detected on the PSCell or the SCell; and transmitting, to the SN, an indication of the DL beam for communication with the UE.

One or more of the above example methods wherein the transmitting of the report comprises transmitting the report to an MN having an MCG along with instructions to forward the report to the SN.

One or more of the above example methods wherein the transmitting the report to the MN comprises transmitting the report via one of an RRC message, an MAC CE message, or a DCI message.

One or more of the above example methods wherein the report includes an indication of the beam failure being detected on the PSCell or the SCell, and wherein the method further comprises receiving, from the SN via the MN in response to the transmitting of the report, an indication of resources for a BFR procedure on the SCG.

One or more of the above example methods further comprising: communicating with the SN through an RACH message on the PSCell in response to the receiving of the indication of resources for the BFR procedure on the PSCell or the SCell of the SCG.

One or more of the above example methods wherein the report includes an indication of the beam failure being detected on the PSCell or the SCell, and wherein the method further comprises receiving, from the SN via the MN in response to the transmitting of the report, an indication that no BFR procedure on the SCG will be performed.

One or more of the above example methods wherein the report includes an indication of the radio link failure being detected, and wherein the method further comprises receiving, from the SN via the MN in response to the transmitting of the report, an indication for the UE to remain in a radio link failure state on the PSCell.

One or more of the above example methods wherein the report includes an indication of the radio link failure being detected, and wherein the method further comprises receiving, from the SN via the MN in response to the transmitting of the report, first instructions to perform one or more measurements on the one or more SCells of the SCG.

One or more of the above example methods further comprising: performing the one or more measurements on the one or more SCells in response to receiving of the first instructions; and transmitting, to the SN via the MN, a measurement report.

One or more of the above example methods further comprising: receiving, from the SN via the MN, second instructions to update the PSCell to a selected SCell of the one or more SCells in response to the transmitting of the measurement report.

One or more of the above example methods further comprising: transmitting an RACH message on the selected SCell.

An example apparatus, comprising: a memory comprising instructions; and one or more processors communicatively coupled with the memory and configured to: perform all or a part of any of the above example methods.

An example computer readable medium having instructions stored therein that, when executed by one or more processors, cause the one or more processors to: perform all or a part of any of the above example methods.

An example apparatus, comprising: means for performing all or a part of any of the above example methods.

A second example method of wireless communication by an apparatus of a PSCell associated with an SCG, the method comprising: receiving, from the UE, a report based on a radio link failure being detected on the PSCell or a beam failure being detected on one of the PSCell or an SCell of one or more SCells of the SCG, in response to the UE being in a dormant state with respect to the SCG; determining to perform a recovery procedure with the UE or to not perform the recovery procedure in response to the report; and transmitting, to the UE, an indication that the recovery procedure will be performed or not performed.

The above second example method wherein the receiving of the report comprises receiving the report in an RACH message on the PSCell.

One or more of the above second example methods wherein the receiving of the report comprises an indication of a best DL beam for the PSCell or the SCell of the SCG for communicating with the UE in response to the beam failure being detected on the PSCell or the SCell.

One or more of the above second example methods wherein the receiving of the report comprises receiving the report from an MN having an MCG.

One or more of the above second example methods wherein the receiving the report from the MN comprises receiving the report via one of an RRC message, an MAC CE message, or a DCI message.

One or more of the above second example methods wherein the report includes an indication of the beam failure being detected on the PSCell or the SCell, and wherein the method further comprises transmitting, to the UE via the MN in response to the receiving of the report, an indication of resources for the recovery procedure on the SCG, and wherein the recovery procedure is a BFR procedure.

One or more of the above second example methods further comprising: communicating with the UE through an RACH message on the PSCell in response to the transmitting of the indication of resources for the BFR procedure on the SCG.

One or more of the above second example methods wherein the report includes an indication of the beam failure being detected on the PSCell or the SCell, and wherein the method further comprises transmitting, to the UE via the MN in response to the receiving of the report, the indication that the recovery procedure will not be performed, wherein the recovery procedure is a BFR procedure on the SCG.

One or more of the above second example methods wherein the report includes an indication of the radio link failure being detected, and wherein the method further comprises transmitting, to the UE via the MN, the indication that the recovery procedure will not be performed, in response to the receiving of the report, wherein the recovery procedure is a radio link recovery procedure on the SCG.

One or more of the above second example methods wherein the report includes an indication of the radio link failure being detected, and wherein the method further comprises transmitting, to the UE via the MN, first instructions to perform one or more measurements on the one or more SCells of the SCG in response to the receiving of the report.

One or more of the above second example methods further comprising: receiving, from the UE via the MN, a measurement report in response to the transmitting of the first instructions.

One or more of the above second example methods further comprising: transmitting, to the UE via the MN, second instructions to update the PSCell to a selected SCell of the one or more SCells in response to the receiving of the measurement report.

One or more of the above second example methods further comprising: receiving, from the UE, an RACH message on the selected SCell.

An example apparatus, comprising: a memory comprising instructions; and one or more processors communicatively coupled with the memory and configured to: perform all or a part of any of the above second example methods.

An example computer readable medium having instructions stored therein that, when executed by one or more processors, cause the one or more processors to: perform all or a part of any of the above second example methods.

An example apparatus, comprising: means for performing all or a part of any of the above second example methods.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a user equipment (UE), comprising:
    determining the UE has entered a dormant state with respect to a secondary cell group (SCG) of a secondary node (SN) having a primary SCG cell (PSCell) and one or more secondary cells (SCells);
    monitoring, while the UE is in the dormant state with respect to the SCG, to detect a radio link failure or a beam failure on one of the PSCell or an SCell of the one or more SCells; and
    transmitting a report based on the radio link failure being detected or the beam failure being detected.

2. The method of claim 1, wherein the report includes an indication of the beam failure being detected.

3. The method of claim 1, further comprising:
   determining a best downlink (DL) beam for the PSCell or the SCell of the SCG for communicating with the SN in response to the beam failure being detected on the PSCell or the SCell; and
   transmitting, to the SN, an indication of the best DL beam for communication with the UE.

4. The method of claim 1, wherein the transmitting of the report comprises transmitting the report to a master node (MN) having a master cell group (MCG).

5. The method of claim 4, wherein the transmitting the report to the MN comprises transmitting the report via one of a radio resource control (RRC) message, a media access control control element (MAC CE) message, or a downlink control information (DCI) message.

6. The method of claim 4, wherein the report includes an indication of the beam failure being detected on the PSCell or the SCell, and
   wherein the method further comprises receiving, from the SN via the MN in response to the transmitting of the report, an indication of resources for a beam failure recovery (BFR) procedure on the SCG.

7. The method of claim 6, further comprising:
   communicating with the SN through a random access channel (RACH) message on the PSCell in response to the receiving of the indication of resources for the BFR procedure on the PSCell or the SCell of the SCG.

8. The method of claim 4, wherein the report includes an indication of the beam failure being detected on the PSCell or the SCell, and
   wherein the method further comprises receiving, from the SN via the MN in response to the transmitting of the report, an indication that no beam failure recovery (BFR) procedure on the SCG will be performed.

9. The method of claim 4, wherein the report includes an indication of the radio link failure being detected, and
   wherein the method further comprises receiving, from the SN via the MN in response to the transmitting of the report, an indication for the UE to remain in a radio link failure state on the PSCell.

10. The method of claim 4, wherein the report includes an indication of the radio link failure being detected, and
    wherein the method further comprises receiving, from the SN via the MN in response to the transmitting of the report, first instructions to perform one or more measurements on the one or more SCells of the SCG.

11. The method of claim 10, further comprising:
    performing the one or more measurements on the one or more SCells in response to receiving of the first instructions; and
    transmitting, to the SN via the MN, a measurement report.

12. The method of claim 11, further comprising:
    receiving, from the SN via the MN, second instructions to update the PSCell to a selected SCell of the one or more SCells in response to the transmitting of the measurement report.

13. The method of claim 12, further comprising:
    transmitting a random access channel (RACH) message on the selected SCell.

14. The method of claim 1, wherein monitoring to detect the radio link failure comprises:
    monitoring the SCG to detect the radio link failure on the PSCell.

15. The method of claim 1, wherein the transmitting of the report comprises transmitting the report to the SN.

16. The method of claim 15, wherein the report includes an indication of the beam failure being detected, and wherein the transmitting of the report comprises transmitting, to the SN on the PSCell, a random access channel (RACH) message including the report in response to the beam failure being detected.

17. The method of claim 1, wherein the transmitting of the report comprises transmitting the report to a master node (MN) having a master cell group (MCG) along with instructions to forward the report to the SN.

18. A method of wireless communication by a base station of a primary serving cell (PSCell) associated with a secondary cell group (SCG), the method comprising:
    receiving, from a user equipment (UE), a report based on a radio link failure being detected or a beam failure being detected on one of the PSCell or a secondary cell (SCell) of one or more SCells of the SCG, in response to the UE being in a dormant state with respect to the SCG;
    determining to perform a recovery procedure with the UE or to not perform the recovery procedure in response to the report; and
    transmitting, to the UE, an indication that the recovery procedure will be performed or not performed.

19. The method of claim 18, wherein the receiving of the report comprises receiving the report in a random access channel (RACH) message on the PSCell.

20. The method of claim 18, wherein the receiving of the report comprises an indication of a best downlink (DL) beam for the PSCell or the SCell of the SCG for communicating with the UE in response to the beam failure being detected on the PSCell or the SCell.

21. The method of claim 18, wherein the receiving of the report comprises receiving the report from a master node (MN) having a master cell group (MCG).

22. The method of claim 21, wherein the receiving the report from the MN comprises receiving the report via one of a radio resource control (RRC) message, a media access control control element (MAC CE) message, or a downlink control information (DCI) message.

23. The method of claim 21, wherein the report includes an indication of the beam failure being detected on the PSCell or the SCell,
    wherein the method further comprises transmitting, to the UE via the MN in response to the receiving of the report, an indication of resources for the recovery procedure on the SCG, and
    wherein the recovery procedure is a beam failure recovery (BFR) procedure.

24. The method of claim 23, further comprising:
    communicating with the UE through a random access channel (RACH) message on the PSCell in response to the transmitting of the indication of resources for the BFR procedure on the SCG.

25. The method of claim 21, wherein the report includes an indication of the beam failure being detected on the PSCell or the SCell, and
    wherein the method further comprises transmitting, to the UE via the MN in response to the receiving of the report, the indication that the recovery procedure will not be performed, wherein the recovery procedure is a beam failure recovery (BFR) procedure on the SCG.

26. The method of claim 21, wherein the report includes an indication of the radio link failure being detected, and
    wherein the method further comprises transmitting, to the UE via the MN, the indication that the recovery procedure will not be performed, in response to the receiving of the report, wherein the recovery procedure is a radio link recovery procedure on the SCG.

27. The method of claim 21, wherein the report includes an indication of the radio link failure being detected, and wherein the method further comprises transmitting, to the UE via the MN, first instructions to perform one or more measurements on the one or more SCells of the SCG in response to the receiving of the report.

28. The method of claim 27, further comprising:
receiving, from the UE via the MN, a measurement report in response to the transmitting of the first instructions.

29. The method of claim 28, further comprising:
transmitting, to the UE via the MN, second instructions to update the PSCell to a selected SCell of the one or more SCells in response to the receiving of the measurement report.

30. The method of claim 29, further comprising:
receiving, from the UE, a random access channel (RACH) message on the selected SCell.

31. A user equipment (UE), comprising:
a transceiver;
memory comprising instructions; and
one or more processors, individually or in combination, configured to execute the instructions to cause the UE to:
  determine the UE has entered a dormant state with respect to a secondary cell group (SCG) of a secondary node (SN) having a primary SCG cell (PSCell) and one or more secondary cells (SCells);
  monitor to detect a radio link failure or a beam failure on one of the PSCell or an SCell of the one or more SCells, while the UE is in the dormant state with respect to the SCG; and
  transmit, via the transceiver, a report based on the radio link failure or the beam failure being detected.

* * * * *